United States Patent [19]
Johnson

[11] Patent Number: 4,597,433
[45] Date of Patent: Jul. 1, 1986

[54] POLLUTION CONTROL AND HEAT RECOVERY

[75] Inventor: Arthur F. Johnson, Boulder, Colo.

[73] Assignee: Energy Conservation Partnership, Ltd., Boulder, Colo.

[21] Appl. No.: 639,307

[22] Filed: Aug. 9, 1984

[51] Int. Cl.$^4$ .................. F28D 17/00; F28F 19/00
[52] U.S. Cl. .......................................... 165/4; 165/5; 165/7; 165/119; 55/73; 55/84; 55/269
[58] Field of Search ................. 55/73, 390, 269, 84; 165/4, 5, 7, 119, 95

[56] References Cited

U.S. PATENT DOCUMENTS

| | | | |
|---|---|---|---|
| 2,863,723 | 12/1958 | Tigges | 165/7 |
| 4,171,722 | 10/1979 | Huggins | 165/119 |
| 4,398,590 | 8/1983 | Leroy | 165/4 |

Primary Examiner—Albert W. Davis, Jr.
Attorney, Agent, or Firm—Pennie & Edmonds

[57] ABSTRACT

A simple and profitable means to prevent air pollution from the particulate and gaseous pollutants from power plants, by recuperating the heat in the flue gases down to atmospheric temperature and pre-heat the air needed from combustion in the boilers. Most fly ash is removed at the face of the regenerators. Condensed moisture from the flue gases dissolves $SO_2$ and forms a smog, with remaining fly ash particles acting as condensation nuclei, which are caught on the wetted surfaces within the regenerator, washed therefrom to vessels to settle out solids, and the liquid is then treated by vacuum to recover the dissolved $SO_2$, which is compressed to liquid $SO_2$ and stored in refrigerated tank cars, to be sold as a valuable byproduct. The bulk of the fly ash, which settles on the face of (45 degree) sloping "snow fences" built across the top of the pebble bed, slides like snow off of a sloping roof and into gutters with perforated false bottoms, up which flows a little gas and carry it to downspouts and bins. The very fine fly ash travels with the flue gas downwardly to become smog when combining with the water of condensation and absorbed $SO_2$. Cold wash is periodically used to flood to top of the bed and wash out any accumulations of fly ash.

6 Claims, 6 Drawing Figures

POLLUTION CONTROL AND HEAT RECOVERY

BACKGROUND OF THE INVENTION

The prior art is replete with smog abatement processes using ammonia to react with sulphur dioxide, but recovery of ammonium compounds for sale as byproducts increase power plant costs instead of reducing them. Likewise the resulting ammonium-sulphur compounds and particulates in minute amounts produce a plume and smog from power plant chimneys, which is as objectionable as a sulphur oxide smog.

Currently, the least expensive processes being used for power plant pollution abatement provide for scrubbing the flue gas with a limestone slurry. But, locally mined limestone is rarely available, and capital and operating costs for grinding the limestone, and disposing of precipitated gypsum mixed with fly ash, is expensive. Additional costs for electrostatic precipitators or baghouses are the rule rather than the exception. Typically, the amount of limestone or dolomite required to capture all the sulphur from a high sulphur coal is about equal to the weight of ash in the coal, so massive amounts are needed.

Heretofore, power plant recuperators of heat from flue gas have been so subject to corrosion by sulphur acids condensing out from the gas at temperatures of 300° F. or less that they have not been economical, since downtime for repairs is enormously expensive.

In the prior art, flue gas traveling at high velocities has been explosed to scrubber water to remove $SO_2$, wherein film coefficients slow absorption. The physical chemistry at gas speeds of only a foot a second, where fog particles are involved, is quite different from that when speeds of 10 to 40 feet per second existant in conventional practice. The enormous cost of acid resistant metal vessels made large enough to reduce speeds of gas flow through them has prevented them from even being considered.

It is noted in passing that in my previous U.S. Pat. No. 4,054,246, there is disclosed the novel concept of preheating air needed for combustion of power plant fuel by recuperation of the heat in flue gases, using subterranean pits filled with gravel. Further, in my U.S. Pat. No. 4,173,034, the advantages of heat storage in very large beds of pebbles are disclosed in some detail.

Those skilled in the chemical process arts generally appreciate that regenerative and recuperative heaters have been known for centuries. That this is still an active of development is evidenced by three recent U.S. Pat. Nos. 4,383,573; 4,349,069; and 4,361,183, all assigned to Combustion Engineering Inc., which all disclose regenerative heaters, but which are not otherwise pertinent to the present invention.

While the terms "regenerative" and "recuperative" are frequently used in the alternative it is believed that more proper definitions suggest that "regenerative" implies a closed system whereas "recuperative" implies systems where energy may be added (e.g. not a closed system). Insofar as the present invention is of the former type "regenerative" will be used herein.

SUMMARY OF THE INVENTION

A simple and profitable means to prevent air pollution from the particulate and gaseous pollutants from power plants, by recuperating the heat in the flue gases down to atmospheric temperature and pre-heat the air needed from combustion in the boilers. Most fly ash is removed at the face of the regenerators. Condensed moisture from the flue gases dissolves $SO_2$ and forms a smog, with remaining fly ash particles acting as condensation nuclei, which are caught on the wetted surfaces with the regenerator, washed therefrom to vessles to settle out solids, and the liquid is then treated by vacuum to recover the dissoled $SO_2$, which is then compressed to liquid $SO_2$ and stored in refrigerated tank cars, to be sold as a valuable byproduct.

The regenerators of this invention consist of acid-resistant pebbles in beds or walls of sized pebbles. Usually these are piled loosely, but a novel feature provides the pebbles as a solid block by cementing them together, but only at the points of contact of each pebble and its adjacent ones. When hot flue gases are cooled by entering the precooled walls or beds of the regenerator, their contained moisture condenses to produce a fog or smog similar to that produced by nature in the cold air above power plants without pollution control. That is, fine particles of fly ash act as nuclei to condense moisture in minute droplets which instantaneously absorb $SO_2$. The resulting smog is closely confined within the spaces between pebbles, and upon striking their wetted surfaces, is carried downwardly with the flow of condensate. The wetted surface area of the pebble bed must be enormous, because of velocity considerations and the flue gases and smog growing to droplet size are subjected to a tortious path ensuring complete demisting of the flue gas. Shrinkage of gas volume due to cooling and condensation draws gas into the pebble bed.

The bulk of the fly ash, which settles on the face of (45 degree) sloping "snow fences" built across the top of the pebble bed, slides like snow off of a sloping roof and into gutters with perforated false bottoms, up which flows a little gas to fludize the ash and carry it to downspouts and bins. The very fine fly ash travels with the flue gas downwardly to become smog when combining with the water of condensation and absorbed $SO_2$. Cold wash water is Periodically used to flood the top of the bed and wash out any accumulations of fly ash.

Additions of ammonia, lime or magnesium oxide are avoided, since they would prevent cheap recovery of $SO_2$ by vacuum as a valuable byproduct.

Pebbles are preferably quartz or other acid resistant mineral with a low coefficient of expansion, or minerals like slags cast into balls or formulated from fireclay or high alumina cement, combined with heat resistant resins or plastic well known in the chemical industry for resistance to acids. Where walls or blocks of spaced pebbles are needed to enclose baffles to guide coarse fly ash flow to gutters, the pebbles are mixed with a wash or slurry of fireclay or resin or plastic and precast in a form to the shape desired and cured by heat if necessary.

Thus a novel rockbed is disclosed to replace the need for electrostatic precipitators, baghouses, cyclones, gas scrubbers, demisters and their complex ancillary apparatus, and in addition the bed recovers the heat of condensation and sensible heat of flue gas and fly ash. The net effect is to make all coals comparable in heating value, so that pollution control actually becomes profitable, instead of being the large item of expense for power plants it is presently.

OBJECTS OF THE INVENTION

It is a general object of the present invention to provide improved means for pollution control for coal-burning boilers and the like.

A further object of the present invention is to provide improved means of heat and byproduct recovery from flue gases.

A still further object of the present invention is to provide improved means of heat and byproduct recovery for boiler flue gases and the like which are an economic benefit to the overall operation.

Still another object of the present invention is to provide a pair of pebble bed regenerators of very large surface area, whereby flue gas velocities are reduced, fogs/smogs are encouraged to form, and cooling to the ambient range is achieved.

Yet another object of the present invention is to recover heat and byproducts from flue gases heretofore generally wasted.

These and other objects and advantages of the invention will become clear from the following detailed description of embodiments of same, and the novel features will be particularly pointed out in connection with the appended claims.

THE DRAWINGS

Reference will hereinafter be made to the accompanying drawings, in which.

DESCRIPTION OF EMBODIMENTS

In essence, the present invention is based, at least in part, on the discovery that current pollution control systems largely waste sensible heat in flue gases below certain temperatures, largely because of their corrosive nature at such temperatures, and that vast sums of money are spent overcoming the corresiveness, when indeed a better approach is to employ acid-resistant materials under conditions controlled so that contained sulphur is never oxidized to sulphuric acid, but is rather recovered as marketable $SO_2$. The expense of neutralization is thus avoided, a marketable byproduct is produced and, most important, by utilizing the previously-wasted sensible heat to preheat combustion air going to the boiler, savings of truly surprising dimensions are achieved, as set forth in more detail hereinbelow.

Figure 1:
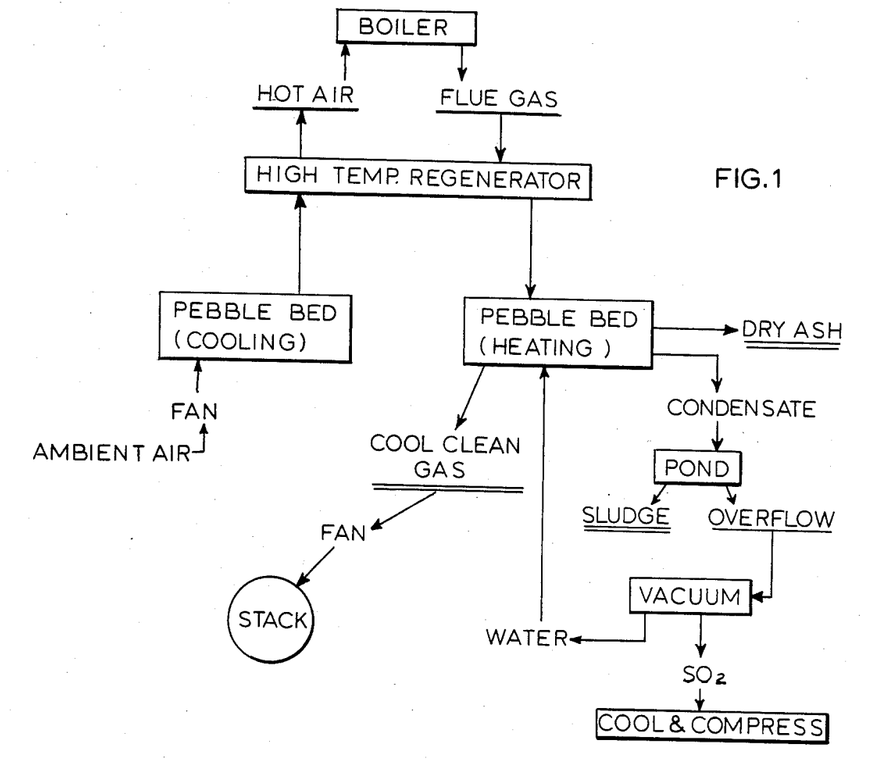
FIG. 1 is a simplified flow sheet or flow diagram illustrating an embodiment of the invention.

In its important aspects the invention is illustrated in the flow sheet of FIG. 1, and attention is directed thereto. Those skilled in the chemical process industries ("C.P.I.") will immediately appreciate the lack of conventional recovery equipment: precipitators, bag houses and, of course, the input of limestone or dolomite necessary to chemically bind the sulfur. Rather, there are a pair of pebble or rock beds. These beds are truly massive, being as large as 75×150×60 feet, and are formed of sized, acid-resistant aggregate (manufactured or natural stone) providing myriad tortuous paths for cooling gases and condensing fluids.

Before discussing these aspects of the invention in detail, however, it is important to note that FIG. 1 is greatly simplified for purposes of clarity and, for example, does not show steam or power as an output. Rather, it merely shows preheated air as an input and flue gas as an output. Both of these flows are shown as passing through a High Temperature Regenerator, which is a conventional unit forming no part of the present invention. However, it is preferred that those units (two are of course necessary) be Ljunstrom-type rotating wheels with closely-spaced metal vanes forming rings around the vertical axis of rotation. Such units have proven efficient and economic between boiler exit gas temperatures and those lower temperatures at which $SO_2$ starts to oxidize and become corrosive, normally below about 500° F. As set forth in more detail hereinbelow, however, the physical chemistry is more complex than meets the eye, and specifying a temperature or even temperature range can be a dangerous generalization.

In any pair of regenerative heaters, it is manifest that the sensible heat retained in one is used to preheat incoming, ambient air prior to combustion in the boiler and, at the same time, hot flue gas is cooled in the other, giving up its heat to the walls of same. What distinguishes the present invention is the much greater extent to which this is carried out.

As noted supra, at lower temperatures in the range of 500° to 200° F., this invention makes use of porous gravel or sized pebble beds. These are in the range of about 1.5 to 6 inches diameter, with closely sized 2 inch diameter gravel chosen in the FIGURES and EXAMPLES described hereinbelow. Preferably, the beds are large enough in area and thickness so gas flow need not be reversed by dampers more often than once every eight hours. Such dampers or valves have been common in iron blast furnace stoves for about 100 years.

After cooling in the pebble bed the flue gases may occupy as little as half the volume they do when entering, due both to condensation of contained water, which involves a volume reduction of 950 to 1, and contraction according to the gas laws, e.g. $PV=RT$. Therefore, fan power to push the clean gas up the power plant chimney is not excessive. Since both particulate and gaseous pollutants that are noxious have been removed in the pebble bed, the need for a stack at all is merely to mix the $CO_2$ and whatever minor CO is present with atmospheric air.

Of course, in a bed preheating ambient air, more-or-less of the reverse holds true: expansion according to the gas laws and vaporization of any moisture, which will be a variable.

As shown in FIG. 1, the condensate, with its contained $SO_2$ entrained in the water of condensation together with $NO_x$, chlorides, and other trace elements, is bled out of the bottom of the recuperator into a settling vessel or pond where clear water containing $SO_2$ is continuously or occassionally removed to a vacuum vessel for evaporation of $SO_2$ and its compression to a liquid, which is conventionally stored in refrigerated tank cars not under appreciable pressure. After $SO_2$ removal, the cold water is returned to the recuperators for washing out any fly ash accumulation and to keep the lowest level of the bed cold, to collect smog while the level of the bed immediately above is reaching hot flue gas temperature. This ensures that the smog will have at least a few feet to travel a tortuous path downward through the pebbles, wet with condensate, and be entrapped thereon.

Figure 2:
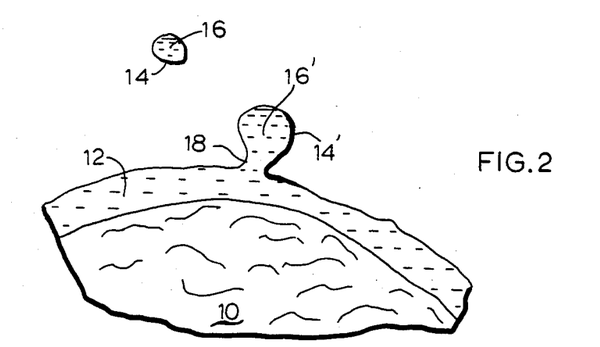
FIG. 2 is a simplified diagram illustrating the concepts of condensate recovery and heat storage in accordance with the invention.

The physical chemistry of this invention may be better understood by consideration of FIG. 2, which is a simplified diagram illustrating smog recovery in condensate water while storing heat in a pebble. In essence, this involves certain physical and thermal interactions between a pebble 10, a covering film of water 12, and smog droplets 14 nucleated on flyash or other particulates 16. As in nature, condensation may start on a particle of flyash 16, since it acts as a nuclei. This condensing fog is distilled water, and, as shown by several scientific papers over the past 24 years, the reaction of $SO_2$ with $H_2O$ in this miniscule state is practically instantaneous, even as acidity increases. Reference is made to "SOME ASPECTS OF $SO_2$ ABSORPTION BY WATER-GENERALIZED TREATMENT" by Gregory R. Carmichael and Leonard K. Peters, published by Pergamon Press Ltd. 1979 in ATMOSPHERIC ENVIRONMENT Vol. 13 pp. 1505–1513. In nature, smog returns to earth when the droplets become large enough to make "heavy" fog or dew. As shown in FIG. 2, droplet 14' has reached film 12 and is attaching as at 18 by surface-tension, but will rapidly become part of film 12. Indeed, in climates where fogs are common, noxious smogs have sometimes produced a rash of fatalities.

Figure 3:
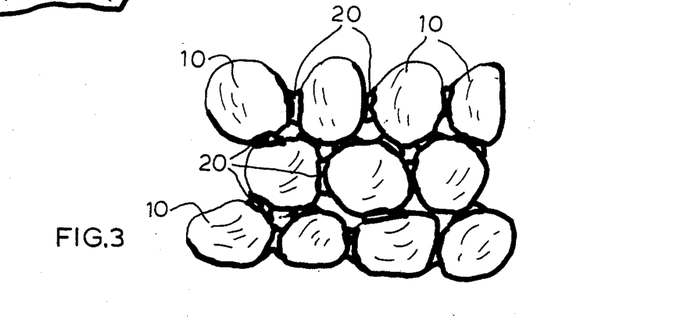
FIG. 3 is a partial, cross-sectional elevation view, highly idealized, of a small portion of a pebble wall or block within the pebble bed of the invention.

FIG. 3 is an idealized cross-section through a porous, pebble wall or pebble block of the invention, wherein evenly-sized crushed rock or pebbles, shown as spheres but actually of more irregular shape, are cemented together at just the points of contact of each pebble with its adjoining pebbles. This is accomplished by mixing the pebbles with a cementing slurry or thick cementing liquid, dumping the mix into a form and jarring or vibrating the form or contained pebble mix sufficiently so that all that remains of the cementing slurry or thick cementing liquid is that which thinly coats the pebble surfaces and which adheres principally around the points of contact of one pebble with its adjoining pebbles. For many purposes in construction of porous walls, floors, ceilings or the like, the slurry may consist of Portland cement with or without fine sand admixed, and water. In the case of the regenerators of this invention, acid resistance is a key element and the cementing slurry should be a fireclay, resin plastic with or without fine quartz sand admixed and water or other liquid. The pebbles are preferably quartz or volcanic rock with lower coefficient of expansion when subjected to repeated heating and cooling. The chemical industry has produced a great many conventional acid-proof cements which may be employed.

Figure 4:
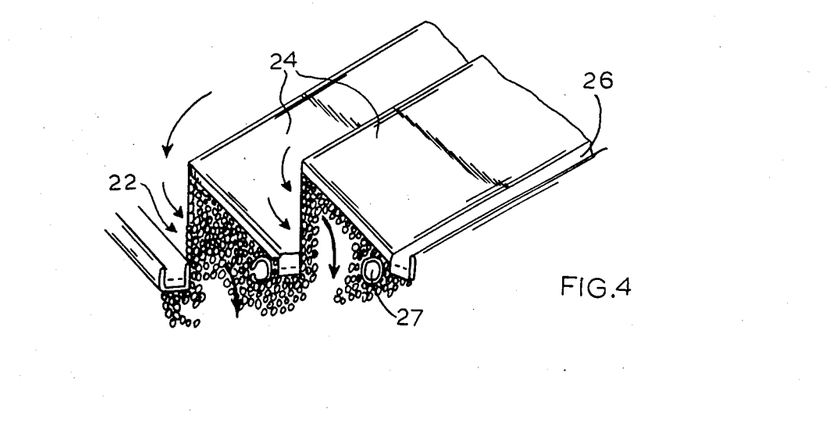
FIG. 4 is a partial, isometric cross-sectional view of the top or upper portion of a pebble bed illustrating removal of some dry fly ash prior to cooling-condensation carried out within the bed.

A most important aspect of the present invention is the exceptionally large area of the pebble heaters, which means that gas velocity therethrough will be very low. In the case of the incoming flue gas, this means that a substantial portion of the contained fly ash, e.g. the larger particles, will cease to be carried by the gas stream and will "drop out." FIG. 4 is an isometric view of means for coarse fly ash catchment over the pebble beds, with conveyance to downspouts by long prism-shaped pebble masses or blocks 22, having a triangular cross-section, made porous as in FIG. 3, but faced on the upper surface with a very hard and smooth slab 24 of acid resistant concrete, so the fly ash accumulating thereon will slide off into acid proof tile gutters 26 which include a gas permeable bottom, so fly ash falling therein is conveyed to downspouts (not shown) by fluidized flow. The prism shapes 22 are precast in forms and arranged on top of each pebble bed regenerator so they act like snow fences in causing the great bulk of fly ash to fall into the gutters directly or onto the smooth prism faces sloping at about 45 degrees, so any considerable depth of fly ash accumulating slides off into the gutters just as snow slides off a metal roof. The gas fed under the false bottom of the gutters must be very clean, dry and hot so that it will never plug the pores of the false floor of the gutters or cause the fly ash to cake in its route to the downspouts and bins (not shown) below the pebble beds. Alongside the gutters are acid proof tile pipes 27 with perforations on their sides opposite the gutters for flooding the pebble beds occasionally as needed to quickly flush down any accumulation of light fly ash between pebbles, which has not been carried down by the water of condensation from the flue gases. The upper layers of the recuperators are easily accessible for repair or replacement of prism shapes, gutters, flooding conduits or pebbles although little maintenance is contemplated, insofar as with time-proven materials of construction the pebble bed should last the life of the power plant. Some crumbling of pebbles is not serious, unless travel of flue gas becomes impeded.

Figure 5:
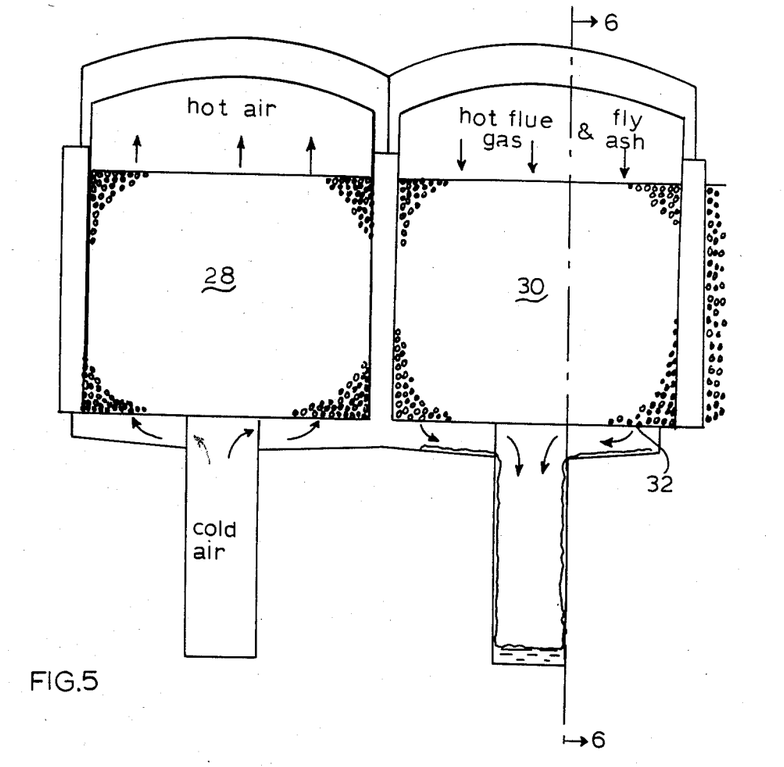
FIG. 5 is a transverse, vertical cross-sectional view of a pair of pebble beds in accordance with the invention.
Figure 6:
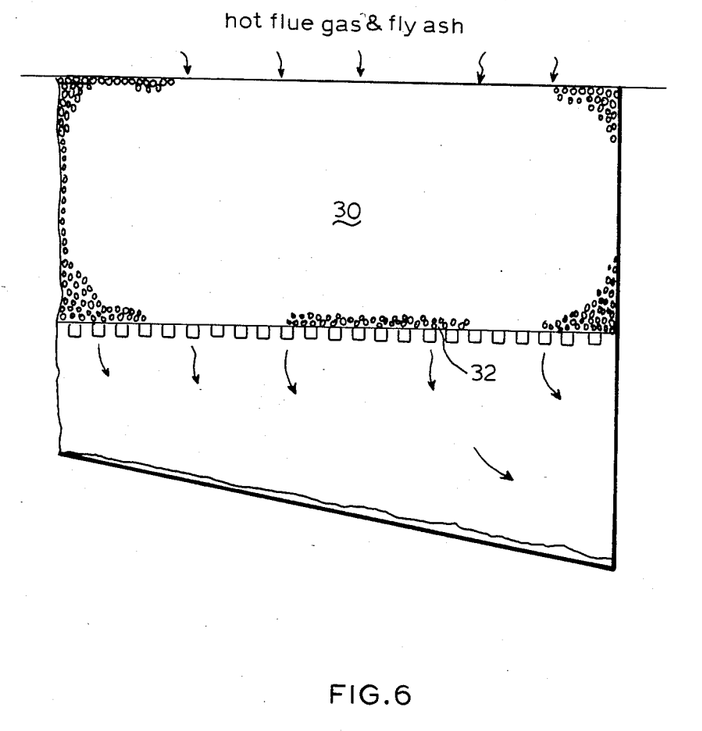
FIG. 6 is a longitudinal, vertical cross-sectional view of a pebble bed, taken along line B—B of FIG. 5.

FIG. 5 is a transverse, vertical section and FIG. 6 is a longitudinal vertical cross-section through a preferred embodiment of the pebble beds 28, 30 of this invention, and featuring low construction and operating costs in comparison with conventional means now employed to carry out the functions of collecting fly ash, cooking the flue gases and removing the noxious and very fine particulates and noxious gases therefrom. This is true despite the very substantial size of these beds.

The beds are in the order of 10 to 80 feet deep or more; this, of course, depends on the size of the power plant. Preferably, the beds are closely sized, spherically-shaped, and are of acid-resistant composition, so as not to be subject to deterioration by repeated heating and cooling, over 20,000 cycles, between 50° F. and 300° F. Any pebble (32) layer may be a single size from about ¾ inches diameter to 5 inches or more, but smaller pebbles must not be above larger ones. Smaller sizes have more surface to promote $SO_2$ recovery in the condensate but have a much higher resistance to flue gas flow, and there is greater danger of plugging pore spaces. If mixed sizes were used, of course, gas flow would all but cease.

The horizontal cross-section of the beds is made large enough to slow flue gas speeds downwardly to about 1 foot per second or less at the entering face, which may be only half the velocity at the bottom of the bed due to cooling-contraction. As the hot flue gases reach the enormous area of the precooled pebbles, they are slowed to perhaps one-fifth or one-tenth of their previous speed, and at once start dropping their coarse fly ash on the prism-shaped "show fences," and thence into the gutters. As the partially cleaned flue gases enter the previous cooled bed, the heat capacity of the first foot or two of pebble layers condenses enough moisture to produce a steam-fog and smog out of fly ash, condensed moisture and very fine fly ash. As discussed supra in connection with FIG. 2, the droplet grows in size, its momentum inevitably causes it to collide with the already wetted surface of a pebble, where it is entrapped with further condensate and washed downwardly over colder pebbles so the $SO_2$, once absorbed, tends to be retained. As in "Principles of Chemical Engineering" by Walker, Lewis and McAdams explained almost 60 years ago: "Thus, if $SO_2$ gas, whether or not mixed with inert gas, be brought in contact with water at 20° C., the $SO_2$ will continue to dissolve in the water until its concentration is sixty times that in the gaseous phase." It should be noted that the cooling of the flue gas is done at the face of a pebble so condensation and simultaneous solution of $SO_2$ must primarily occur there.

It should be appreciated that the top layers of rocks in the beds will heat up first, while the layers beneath remain cool. The absorbing surface and heat capacity of the rocks is so great that the heating of layers proceeds like a wave. Each successive layer will reach something close to flue gas temperature before the rate of heat transfer slows appreciably and the next layer starts to warm up. But, hot water of condensation, running downwards will speed the process somewhat. The beds must be deep enough so that the lowest layer is cool, and will condense all the water in the flue gases and, furthermore, provide a layer of cool pebbles, so that the smog in twisting and turning around pebbles will be entrapped on the water film covering each pebble.

EXAMPLES

Some specific examples will aid in understanding the invention are set forth hereinbelow. Base-line power plant data has been taken from an E.P.A. study, "Rocky Mountain-Prairie Region VIII: Coal-Fired Power Plant Trace Element Study, A Three-Station Comparison" by Radian Corp., Austin, Texas. Example I below is derived therefrom as denoted (*), and in Example II it is as noted thereunder (**). Thus, data in Table I below is * from Vol. 1, page 11, Table 2-2, and in * Table II it is from Vol. 2, page 27, Table 4-1.

TABLE I

| Station II Flow Rates |
| --- |
| Coal: $2.75 \times 10^5$ lb/hr = 3300 tons/day |
| Flue gas: $5.46 \times 10^7$ scfh |

TABLE II

| Station II Coal Analysis | | |
| --- | --- | --- |
|  | As Rec'd, Pct. | Dry |
| Moisture, | 29.19 | |
| Ash, | 5.12 | |
| Volatiles, | 30.15 | |
| Fixed Carbon, | 35.54 | |
| BTU/lb | 8290 | 11,708 |
| Ultimate, Pct. | | |
| Carbon | 48.31 | |
| Hydrogen | 6.53 | |
| Nitrogen | 0.67 | |
| Oxygen | 39.02 | |
| Sulphur | 0.35 | |
| Ash | 5.12 | |

By estimating the amount of heat which can be recuperated from the flue gases of one pound of coal to preheat the air needed for its combustion, the tons of coal saved by this invention each day can be readily obtained. First, the heat in the steam condensed from the gases is estimated. Second, the sensible heat in cooling the gases down from 300° F. to 50° F. is estimated. The sum of these BTU savings is the increase in the heating value of the coal. Thus, fewer tons will be needed. Heat recovered conventionally (from gases at boiler temperature down to 300° F.) is not included.

Those familiar with heat and material balances will appreciate that total moisture in the boiler flue gases includes all water made from $H_2$ during combustion, plus moisture in and on the coal, and moisture in the combustion air. In Table III below, data for calculating the latter figure have been taken from "Combustion Engineering" (First Ed.) pp. 25—25 and 25-26, which assume 22% excess air and 34% volatiles, deemed reasonable.

TABLE III

| Heat of Condensation/lb. Coal | |
| --- | --- |
| Source | $H_2O$ per lb. |
| Wet coal (as rec'd.) | 0.2919 |
| Combustion (from $H_2$) | 0.5877 |
| (0.0653 × 9) | |
| In Comb. Air | 0.1007 |
|  | 0.9803 |

So, with a heat of condensation of 950 BTU/lb, there is $0.9803 \times 950 = 930$ BTU recoverable from this water. The sensible heat in these gases is, in essence, that recoverable in cooling from 300° F. to about 50° F.

TABLE IV

| Sensible Heat in Flue Gases (per one pound of coal) | |
| --- | --- |
| $5.46 \times 10^7$ scfh/2.75 × $10^5$ = 198.54 scfh per lb. coal | 930 (from Table III) |
| 198.54 × 0.238 × 0.075 × 250 = [scfh × (sp. heat) × lb/cf × F.° temp. change] | 886 |
| TOTAL | 1816 |

The recuperator efficiency is 95% both in and out, $=90.25\% \times 1816 = 1639$ BTU. Thus, the equivalent heating value of coal, attained by invention by conservation is $=8290+1639=9929$ BTU. So if -
Y=tons coal/day with invention, then
$Y \times 9929 = 3300 \times 8290$. So Y=2755 tons coal per day
3300−2755=545 tons coal saved.
At $40/ton, this equals a: saving of $21,800/day.
The design of FIGS. 4,5, and 6 comprises a pair of pebble beds, which, to be properly effective should each be 75 ft. wide by 150 ft. long and 60 ft. deep. Pebbles are closely sized quartz pebbles or volcanic rocks about two inches in diameter. The heat capacity is calculated below for one of the pair of recuperator beds.

TABLE V

| Bed Heat Capacity | | | | | |
| --- | --- | --- | --- | --- | --- |
| Volume Of Bed cu. ft. | Rock Density of Solids lbs/cu. ft. | % Solid Rock (voids = 42%) | Specific Heat BTU/lb | Temperature Change/cycle degrees F. | Heat Capacity BTU |
| 75 × 150 × 60 = 6.75 × | 165 × | 0.58 × | 0.21 × | 250 = | $3.391 \times 10^9$ |

TABLE V-continued

| Volume Of Bed cu. ft. | Rock Density of Solids lbs/cu. ft. | Bed Heat Capacity % Solid Rock (voids = 42%) | Specific Heat BTU/lb | Temperature Change/cycle degrees F. | Heat Capacity BTU |
|---|---|---|---|---|---|
| $10^5 \times$ | | | | | |

The heat recuperated per day is: 1639/lb×2000×2755 tons=9.03×10⁹. Therefore, the dampers reversing the flow through the beds need to be set to change once every 8 hour shift, although 9 hours allowable.

The flue gas speed downward and combustion gas speed upward are calculated as follows:

$5.46 \times 10^7$ scfh×(2755/3300÷[60 (min./hr.)×11,250 sq. ft.]=68 ft/min, or about 1 ft. per second. The pressure necessary to force this flow with 2 in. diameter pebbles is about 0.08×60 ft. (depth) or 4.8 inches water. The weight of 4.8 inches of water spread over 150×75 sq. ft. is 281,250 lbs. which, moving at 1 ft./sec., becomes ftlb/sec. Since a kilowatt is equivalent to 737.7 ft.lb/sec., a fan of 281,250/737.7 or about 380 kw is required for each of the recuperators in the pair. Each would add 380×0.948×60×60=12×10⁵ BTU/hr friction heat), equivalent to about 1.5 tons coal/day.

The recovery of $SO_2$ is readily obtained from a calculation of the %$SO_2$ in the flue gas, compared to the $SO_2$ recovered in the water of condensation, bearing in mind that equilibrium will be reached and further recovery will cease, when the condensed $SO_2$ equals 60 times the concentration by weight in the flue gas. In this EXAMPLE I., if all the $SO_2$ were to remain in the flue gas, it would contain %S=0.35×2=0.70% $SO_2$/per lb. of coal.

TABLE VI

| Degree of Extraction of $SO_2$ From the Flue Gas | $SO_2$ in Flue Gas | SO₂ Extraction 60 × % $SO_2$ in Flue Gas | % $SO_2$ in Condensate by Extraction Process |
|---|---|---|---|
| 0 | 0.047%*** | 2.82% | 0 |
| 20% | 0.0376% | 2.256% | 0.143% |
| 40% | 0.0282% | 1.692% | 0.286% |
| 60% | 0.0188% | 1.128% | 0.429% |
| 80% | 0.00940% | 0.564% | approx. = 0.572% at approximate equilibrium |
| 90% | 0.00470% | 0.282%* | 0.643% |
| 100% | 0 | 0 | 0.715%** |

Notes Explaining Derivation of Figures in above Table
***The $SO_2$ in the flue gas at 0% extraction is calculated as follows: % $SO_2$ in coal is 2 × % S = 0.70% or 0.007 lbs/lb coal. Since scfh flue gas/lb coal = 5.46 × 10⁷/2.75 × 10⁵ = 198.54 scfh, then lb flue gas/lb coal = 0.075 lb/cf × 198.54 = 14.98 lb $SO_2$/lb flue gas = 0.007/14.89 = 0.00047 = 0.047%
**The $SO_2$ in the condensate at 100% extraction is calculated as follows: % $SO_2$ in coal is 2 × % S = 0.70% or 0.007 lbs/lb coal. The condensate was previously calculated as 0.9796 lbs, so the $SO_2$/lb condensate = 0.007/0.9796 = 0.00715 = 0.715%
*The 90% extraction is achievable by diluting the condensate with fresh water or condensate from which the $SO_2$ has been removed by vacuum. This dilution would be done by flooding the lower 10 ft. of pebble bed. That is, by adding 1.3 lb fresh water to 1 lb condensate making 2.3 total. The 0.643% $SO_2$ is reduced to 0.643/2.3 or 0.280%, comparable with 0.282% which is the amount of flue gas $SO_2$ in water at equilibrium with flue gas containing 0.00470% (see Walker, Lewis and McAdams reference, supra).

EXAMPLE II

A North Dakota Coal is considered in the following example. References to the EPA study (supra) are Table 2-3, p. 12, Vol. 1, and Table 4-1, page 28, Vol. 4.

TABLE VII

| STATION III FLOW RATES | |
|---|---|
| STREAM | FLOW RATE |
| Coal | 2.34 × 10⁵ lb/hr |
| Flue Gas | 4.11 × 10⁷ scfh |

TABLE VIII

| STATION III COAL ANALYSIS | |
|---|---|
| | As Received, Pct |
| Proximate | |
| Moisture | 36.84 |
| Ash | 7.84 |
| Volatiles | 26.24 |
| Fixed Carbon | 29.08 |
| | 100.00 |
| Sulphur | 0.91 |
| BTU/lb | 6214 |
| Ultimate, Pct. | |
| Carbon | 41.91 |
| Hydrogen | 6.77 |
| Nitrogen | 0.60 |
| Oxygen | 41.97 |
| Sulphur | 0.91 |
| Ash | 7.84 |
| | 100.00 |

To calculate the coal which can be saved with this North Dakota coal used in a power plant by using the invention, the same procedure applies as used in Example I. Savings by recuperating the heat of the condensate and sensible heat in the flue gases are computed below and added together.

$$\frac{\text{HEAT OF CONDENSATION}}{\text{per one pound of coal}} = \text{POUNDS H}_2\text{O} \times 950 \text{ BTU/lb}$$

-continued

| | |
|---|---|
| $H_2O$ as moisture in coal | 0.3684 |
| $H_2O$ from hydrogen (0.0677 × 9) | 0.6093 |
| $H_2O$ in air for combustion | 0.0755 |
| 0.013 × 935 lb air | |
| 0.006214 coal heat value per million BTU | |
| Total lb $H_2O$ per lb coal | |

$$1.0532 \times 950 \frac{\text{HEAT OF CONDENSATION}}{\text{BTU/lb}} = 1000 \text{ BTU}$$

SENSIBLE HEAT IN FLUE GASES
(per one pound of coal)
4.11 × 10$^7$scfh/2.34 × 10$^5$ =
175.68 × 0.238 × 0.075 × 300°

$$\text{(scfh/lb coal) (sp.ht.) (lb/cu. ft.) F.° temp change} = \frac{\text{SENSIBLE HEAT}}{1940} \frac{940}{= 1750}$$

Recuperator efficiency in & out 90.25% × TOTAL
Heating value of coal obtained by invention = 6214 + 1750 = 7964 BTU/lb To determine the coal saved per day, again let Y = coal used per day, with the invention, then Y × 79.64 = 2808 × 6214, so Y = 2191.

The tons saved per day = 2808 − 2391 = 617; so dollars saved per day = 617 × $40/ton coal = $24,680/day.

Besides the coal saving, the invention greatly reduces $SO_2$ pollution as the following Table IX illustrates.

TABLE IX

EXTRACTION OF $SO_2$

| Degree of Extraction of $SO_2$ From the Flue Gas | $SO_2$ in Flue Gas | 60 × % $SO_2$ in Flue Gas | % $SO_2$ in Condensate by Extraction Process |
|---|---|---|---|
| 0% | 0.138%*** | 8.28% | 0 |
| 20% | 0.110% | 6.62% | 0.34% |
| 40% | 0.083% | 4.98% | 0.69% |
| 60% | 0.055% | 3.30% | 1.04% |
| 80% | 0.014% | 1.68% | 1.38% |
| 90% | 0.014% | 0.83%* | 1.56%** |
| 100% | 0 | 0 | 1.728%** |

Notes explaining this Table
***The $SO_2$ in the flue gas at 0% extraction is calculated as follows: % $SO_2$ in coal is 2 × % S = 1.85% or 0.0182 lbs/lb coal and since scfh flue gas/lb coal - 4.11 × 10$^7$/2.34 × 10$^5$ = 175.64 scfh so lb flue gas/lb coal = 0.075 lb/cf × 175.64 = 13.17 lb $SO_2$/flue gas = 0.0182/13.17 = 0.00138 = 0.138%
**The $SO_2$ in the condensate at 100% extraction is calculated as follows: % $SO_2$ in coal is 2 × 5 S = 1.82% or 0.0182 lbs/lb coal and since lb condensate was previously calculated as 1.0532 the $SO_2$/lb condensate is 0.0182/1.0532 = 0.01728 = 1.728%
*The 90% extraction is achievable by diluting the condensate with fresh water or condensate from which the $SO_2$ has been removed by vacuum. This dilution would be done by flooding the lower 10 ft. of pebble bed. That is, if an amount of fresh water equal to that in the condensate were added, the $SO_2$ in the condensate would be halved from 1.56% to 0.78% which is lower than 0.83% in equilibrium with flue gas containing 0.014% $SO_2$. (see Walker, Lewis and McAdams reference previously given)

In calculating the heat of condensation used in both examples, a figure od 950 BTU/lb water condensed was used when actually the accepted standard is 1050.3. This makes the above estimates of saving on the conservative side.

As a rough estimate this invention recovers about 90% of the high heating value. The recuperator efficiency of 95% in and 95% out equals 90.25%. Thus, the coal industry as well as the power industry are enormously benefitted both by the coal savings, as well as making high sulphur coal valuable without causing air pollution.

Although these examples show the use of coal, it will be appreciated that savings with oil and natural gas furnaces will be greater to the extent that $H_2O$ condensate is greater, due to more hydrogen in the oil or gas.

Various other changes in the details, steps, materials, and arrangements of parts, which have been herein described and illustrated in order to explain the nature of the invention, may be made by those skilled in this art within the principle and scope of the invention as defined in the appended claims. For example, it will be appreciated that while this invention has been described with reference to boiler installations for power generation from fossil fuels, it is not so limited and may be employed with any large-scale furnaces burning such fuels; copper smelting, glassmaking or pig iron or scrap melting operations come to mind.

What is claimed is:

1. A heat regenerator for fossil fuel flue gases comprising:
   a massive bed of sized, acid-resistant aggregate, said aggregate being contained within acid-resistant walls, a roof and support structure, individual aggregate pieces being of sufficient size to avoid large pressure drops within said bed and provide myriad tortuous paths for cooling flue gases flowing therethrough;
   said bed being of sufficient horizontal cross-section to reduce the velocity of said flue gas to a point where substantial particulates quickly lose suspension;
   support means for collecting the substantial particulates before entering the top of the bed;
   first means for removing said substantial particulate from the support means before entering the top of said bed;
   second means for removing fine particulates and condensates near the bottom of said bed; and
   said bed being constructed to withstand repeated thermal cycling within the range of at least 50° to 350° F.

2. A heat regenerator unit for fossil fuel furnaces comprising:
   a pair of heat regenerators as claimed in claim 1;
   means for supplying flue gas to the top of one of said pair;
   means for supplying ambient air to the other said pair;
   means for conveying air pre-heated in the other said pair for combustion in said furnace; and
   means for periodically reversing said flow.

3. The regenerator as claimed in claim 1, wherein said individual aggregate pieces are rock, sized between about one-half and five inches in diameter.

4. The regenerator as claimed in claim 1, wherein said individual aggregate pieces are cemented to each other and to portions of said containment at natural points of contact, whereby structural strength is enhanced while preserving said tortuous paths.

5. A heat regenerator for fossil fuel flue gasses comprising:
- a massive bed of sized acid-resistant aggregate, said aggregate being contained within acid-resistant walls, a roof and support structure, individual aggregate pieces being of sufficient size to avoid large pressure drops within said bed and provide myriad torturous paths for cooling flue gasses flowing therethrough;
- said bed being of sufficient horizontal crosssection mass to reduce the velocity of said flue gas to a point where substantial particulates quickly lose suspension;
- means for removing said substantial particulates before entering said bed;
- means for removing fine particulates and condensates near the bottom of said bed including
- settling and liquid recovery means; vacuum means adapted to recover sulfur dioxide from said liquid; and compression and refrigeration means for condensation of said sulfur dioxide; and said bed being constructed to withstand repeated thermal cycling within the range of 50° to 350° F.

6. A heat regenerator for fossil fuel flue gases comprising:
- a massive bed of sized, acid-resistant aggregate, said aggregate being contained within acid-resistant walls, a roof and support structure, individual aggregate pieces being of sufficient size to avoid large pressure drops within said bed and provide myriad tortuous paths for cooling flue gases flowing therethrough;
- said bed being of sufficient horizontal cross-section to reduce the velocity of said flue gas to a point where substantial particulates quickly lose suspension;
- means for collecting said substantial particulates before entering the top of said bed comprising at least one sloped surface positioned in the area where the substantial particulates lose suspension such that the substantial particulates collect thereon;
- a gutter positioned at the lower edge of each such surface for collecting substantial particulates which slide off of each such sloped surface into said gutter;
- means for removing fine particulates and condensates near the bottom of said bed; and
- said bed being constructed to withstand repeated thermal cycling within the range of at least 50° to 350° F.

* * * * *